Dec. 28, 1954     R. WIDERÖE     2,698,384
MAGNETIC INDUCTION ACCELERATOR
Filed Nov. 8, 1946     3 Sheets-Sheet 1
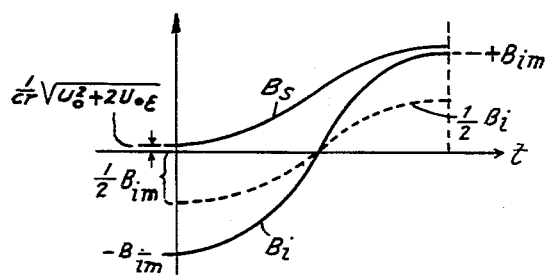
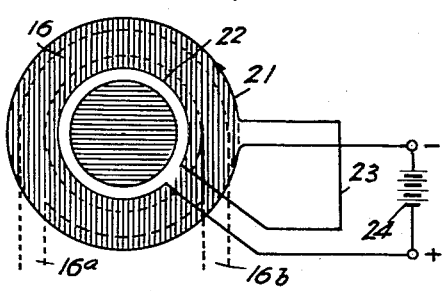
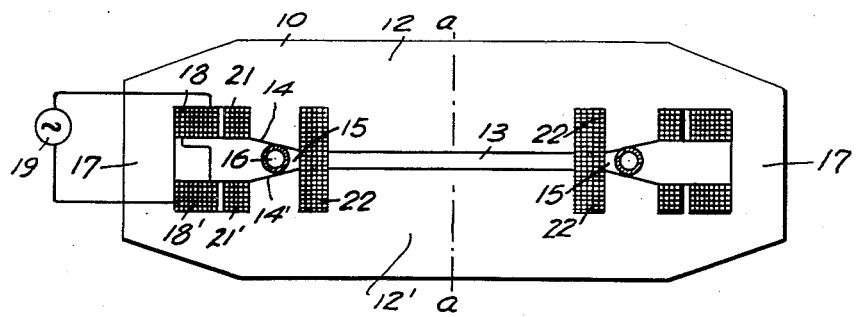
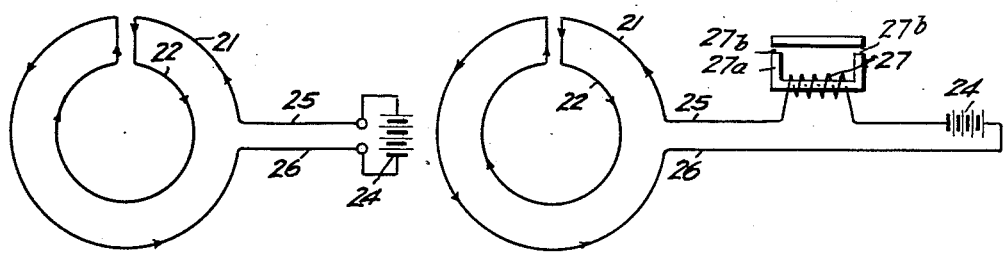
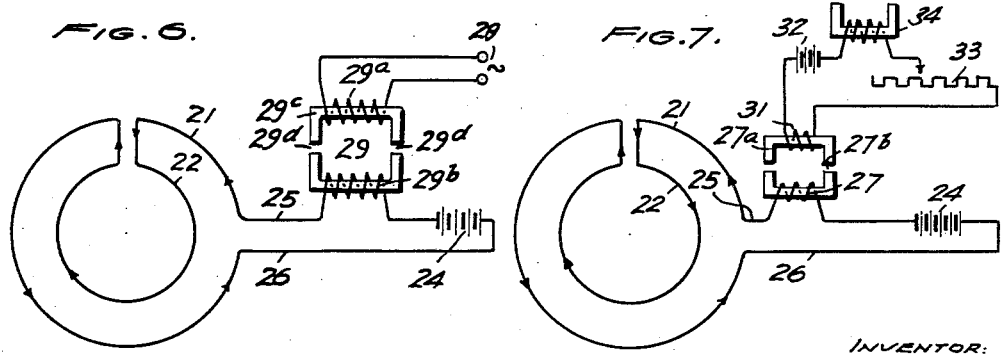
INVENTOR:
Rolph Wideröe,
BY Pierce, Scheffler & Parker.
ATTORNEYS.

Dec. 28, 1954  R. WIDERÖE  2,698,384
MAGNETIC INDUCTION ACCELERATOR
Filed Nov. 8, 1946  3 Sheets-Sheet 2
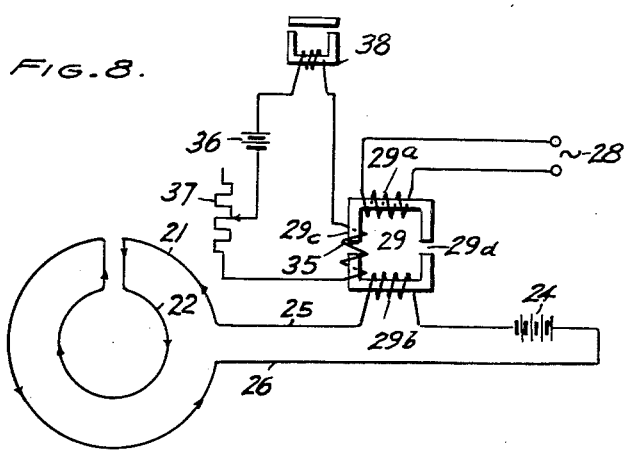
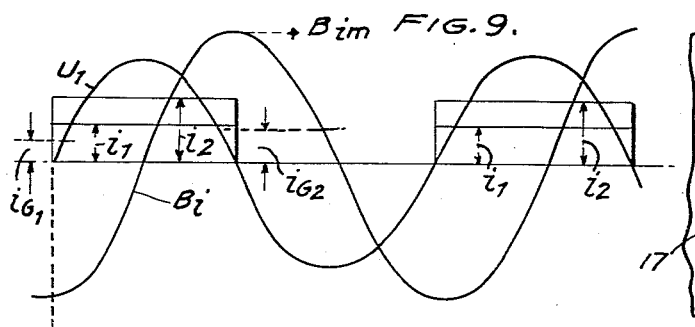
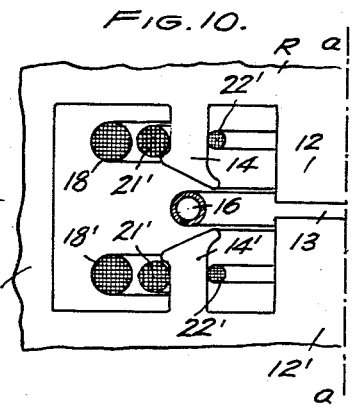
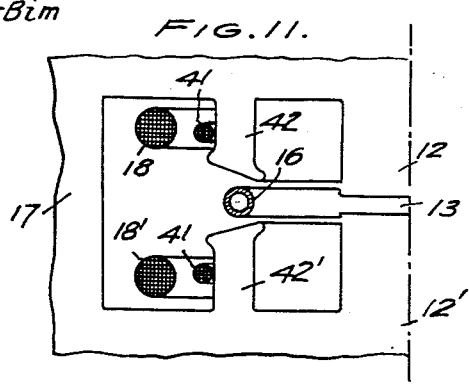
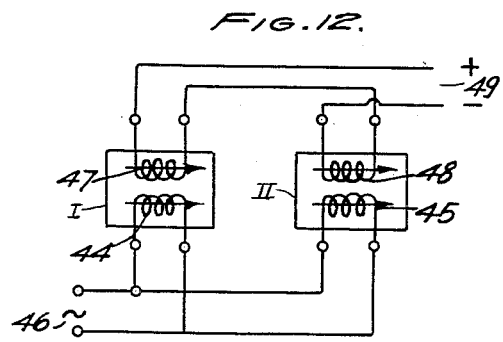
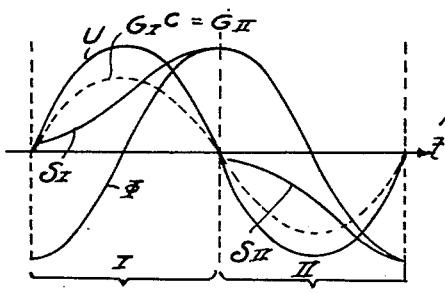
INVENTOR:
Rolph Wideröe,
By Pierce, Scheffler & Parker.
ATTORNEYS.

Dec. 28, 1954   R. WIDERÖE   2,698,384
MAGNETIC INDUCTION ACCELERATOR
Filed Nov. 8, 1946   3 Sheets-Sheet 3
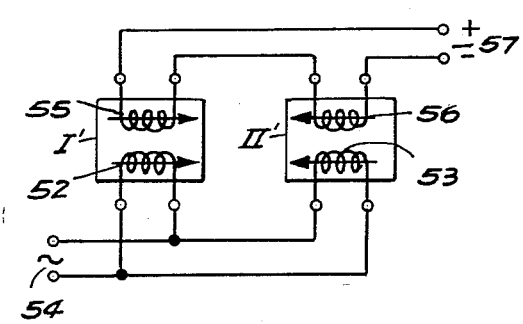
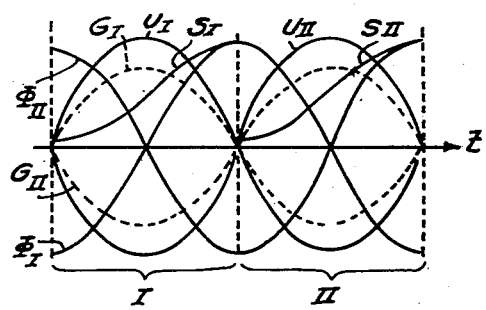
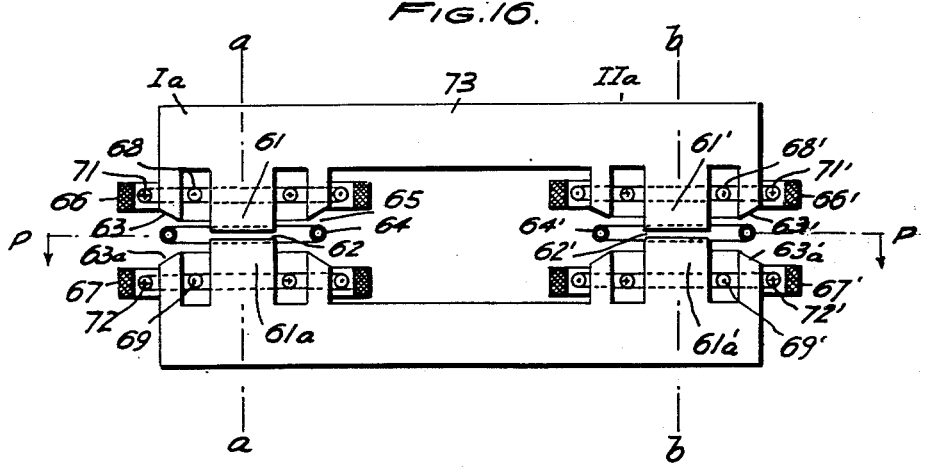
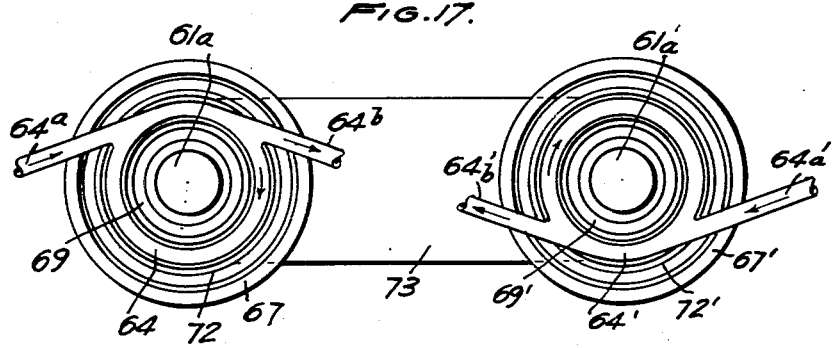
INVENTOR:
Rolph Wideröe,
BY Pierce, Scheffler & Parker,
ATTORNEYS.

United States Patent Office 2,698,384
Patented Dec. 28, 1954

2,698,384

MAGNETIC INDUCTION ACCELERATOR

Rolf Wideröe, Mehlumveien, Norway, assignor to Aktiengesellschaft Brown, Boveri & Cie, Baden, Switzerland, a joint-stock company Application November 8, 1946, Serial No. 708,552
In Germany September 1, 1943

Section 1, Public Law 690, August 8, 1946
Patent expires September 1, 1963

16 Claims. (Cl. 250—27)

The present invention relates to devices for accelerating charged particles, such as electrons to high velocity and hence to high electron voltage by means of magnetic induction effects. These devices are often referred to as "ray transformers" and a typical construction already known includes an annular evacuated tube in which the electrons are accelerated on a circular orbit, an inducing core extending through the axis of the tube, a pair of annular control poles facing one another at the electron orbit and a winding energized from a source of alternating current to produce a magnetic flux varying with time in the inducing core and control poles. The time varied flux in the inducing core functions to accelerate the electrons while the flux in the control poles functions to guide the electrons in a stabilized circular path.

It has already been established that for a device of the general type described, the following relation must obtain between the field strength of $B_s$ of the control field, the mean field strength $B_i$ of the inducing field through the plane of the electron orbit and the electron voltage $U$.

$$B_s = \frac{1}{cr}\sqrt{U^2 + 2U\epsilon}$$

$$B_s = \frac{1}{2}(B_i - B_{i_0}) + \frac{1}{cr}\sqrt{U_0^2 + 2U_0\epsilon} \quad (1)$$

where $$\epsilon = \frac{m_0 c^2}{e} = 510 \text{ kv.}$$

$r$ = mean radius of annular tube
$c$ = speed of light = $3 \cdot 10^{10}$ cm./sec.
$B_{i_0}$ = initial or starting value of inducing flux
$U_0$ = initial or starting value of electron voltage In the earlier known types of magnetic induction accelerators for electrons the initial electron voltage and field strength of the inducing flux were so chosen that the following relation obtained.

$$B_{i_0} = \frac{2}{cr}\sqrt{U_0^2 + 2U_0\epsilon} \quad (2)$$

With the relationship established in accordance with Equation 2, it follows that the strength of the control or guiding field $B_s$ always then had to be half as great as that of the inducing field $B_i$ during electron acceleration to stabilize the circular path of the electrons. Furthermore, in magnetic induction devices constructed with such a ratio in field strength, electron acceleration was possible only during a quarter cycle of the inducing current, best results having been obtained by energization of the electron emissive cathode for a brief period substantially at the instant that the accelerating or inducing magnetic field passed through its zero point in the cycle and leading off the electrons a quarter of a cycle later when the inducing field reached its maximum value in a positive direction.

The general object of this invention is to provide an improved construction for a magnetic induction accelerator which makes it possible to accelerate the charged particles to higher velocities and hence higher electron voltages than heretofore possible.

A more specific object is to provide a construction for magnetic induction accelerators by which the acceleration period for the charged particles is extended over a half cycle of the inducing field thereby substantially doubling the final velocity and voltage of the particles heretofore obtainable with a quarter cycle ray transformer of corresponding dimensions.

Another specific object is to provide a magnetic induction accelerator in which the charged particles are introduced into the accelerating chamber at substantially the instant that the alternating inducing field reaches its maximum value in the negative direction, the particles then being accelerated continuously under the action of the inducing field until the latter reaches its maximum value in the positive direction one half cycle later.

Yet another object is to provide an improved construction for a magnetic induction accelerator wherein the flux produced by the direct current component of the circling stream of charged particles is effectively reduced to zero by a counter flux of substantially like magnitude.

These and other objects and advantages of the invention will become apparent from the following detailed description of preferred constructions for a magnetic induction accelerator embodying the invention when considered with the accompanying drawings in which:

Fig. 1 is a plot of curves showing the new relationship between the inducing and control fluxes;

Fig. 2 is a vertical section through a diameter of one constructional example of a magnetic induction accelerator embodying the invention;

Figs. 3–8 are diagrammatic views showing various possible arrangements for pre-magnetizing the control field poles;

Fig. 9 is a plot of curves showing the relationship between various flux, current and voltage factors for a modified construction of a magnetic induction accelerator shown in vertical section in Fig. 10;

Fig. 11 is a vertical section of yet another form of magnetic induction device embodying the invention;

Figs. 12 and 14 are diagrammatic views of further forms of the invention as applied to a pair of inductance type electron accelerators;

Figs. 13 and 15 are plots of curves related to the devices shown in Figs. 12 and 14;

Fig. 16 is a vertical section showing one practical arrangement of a dual electron accelerator illustrated diagrammatically in Figs. 12 and 14, and Fig. 17 is a horizontal section taken on lines $p$—$p$ of Fig. 16.

In general, the higher electron voltage is attained by premagnetizing the control poles by means of a winding or windings on these poles energized by a direct current to the end that the electrons will run in the same direction with both positive and negative values of the inducing field.

In accordance with Equation 1, the following equation may be set forth for the magnetic control field $B_s$:

$$B_s = \frac{1}{2}B_i + \left(\frac{1}{cr}\sqrt{U_0^2 + 2U_0\epsilon} - \frac{1}{2}B_{i_0}\right)$$

$$= \frac{1}{2}B_i + B_{s_0} \quad (3)$$

In the event it be assumed that the induction flux $B_i$ changes during one transformation period from the initial value $-B_{i_m}$ up to the final value $+B_{i_m}$, the advance or direct current pre-magnetization $B_{s_0}$ of the poles which produce the control field to be obtained may be expressed by the equation $$B_{s_0} = \frac{1}{cr}\sqrt{U_0^2 + 2U_0\epsilon} + \frac{1}{2}B_{i_m} \quad (4)$$

while the maximum electron voltage $U_m$ then obtained may be expressed by the equation $$U_m = \epsilon\left(\sqrt{\left(\frac{crB_{i_m}}{\epsilon}\right)^2 + 1} - 1\right) \sim crB_{i_m} - \epsilon \quad (5)$$

i. e. $U_m$ will be about twice as great as that obtainable without advance magnetization of the control field.

The new relationship between the control field $B_s$ and the induction field $B_i$ according to the invention is illustrated by the cosinual curves in Fig. 1 where $B_s$ and $B_i$ are plotted against time $t$.

One constructional form of a magnetic induction device or ray transformer embodying the invention is shown in Fig. 2. With reference to Fig. 2, the device is seen to comprise a magnetic field structure 10 symmetrical about the axis a—a. The field structure may be made up from steel laminations of appropriate dimensions and contour to form a pair of cylindrical pole pieces 12—12′ separated by air gap 13 located concentrically along axis a—a, and a pair of annular poles 14—14′ facing each other and separated by air gap 15 within which rests an annular, evacuated tube 16. Yoke members 17 complete the magnetic circuit for the flux set up in the annular and cylindrical pole pieces. Poles 12—12′ and 14—14′ are surrounded by an annular winding preferably split into two coil sections 18—18′ which are wound in the safe relative direction and connected in series for energization from an alternating current source of suitable frequency, for example 100 cycles/sec., the source being designated by alternator 19 on the drawing. For pre-magnetizing the control field, it will be seen from Fig. 2 that two additional windings 21—22 are provided, these being adapted to be energized with direct current.

In order that the induction flux shall not likewise receive a pre-magnetizing effect from the flux set up by the unidirectional current flow in windings 21—22, it is necessary for both to have a like number of ampere turns, one of them such as winding 21 being placed around the outside of the poles 14—14′ and the other one such as winding 22 around the inside of these poles and so connect the two windings that the inner winding annuls the magnetizing effect of the outer winding. The inner winding 22 is comprised of a single coil while the outer winding 21 is split into two coil sections, and both windings are symmetrically disposed with respect to the air gap 15, i. e. both windings lie half above and half below a horizontal plane through the mid-point between the faces of the control field poles 14—14′.

One suitable arrangement for connecting the pre-magnetizing windings 21—22 is shown somewhat diagrammatically in Fig. 3, in which the control field $B_s$ passes through the annular area shown by the vertical hatching in a direction normal to the plane of the drawing while the inducing field $B_i$ passes in like direction through the circular area shown by the horizontal hatching. The annular tube 16 in which the electrons are accelerated is portrayed in plan with tangentially arranged arms 16a and 16b through which the electrons may be injected and withdrawn respectively from the tube, the windings 21—22 are connected in series by conductor 23 outside of the ray transformer to a source of direct current designated by battery 24, and the direction of current flow in these windings is shown by the arrows.

As an alternative construction, the pre-magnetizing winding 21 could be made a part of the inducing coils 18—18′ in which case the coils 18—18′ would carry both a direct current component for pre-magnetizing the control field poles 14—14′ and an alternating current component for producing the inducing field in poles 12—12′.

Instead of separating the pre-magnetizing windings 21—22 entirely from each other inside of the induction accelerator and connecting them in series outside of the accelerator by conductor 23, the windings could also be made as shown diagrammatically in Fig. 4, the necessary connections between the two being made inside of the accelerator so that only two conductors 25—26 need be brought outside for connection to the direct current source 24.

In connection with the two pre-magnetizing windings 21—22, it will be apparent that the alternating component of the control field flux would normally set up a component of induced alternating current in these windings which must however be blocked out. One suitable way in which this may be accomplished is shown in Fig. 5, a choke comprising coil 27 and core 27a having an air gap 27b to prevent saturation of the core being connected in the direct current circuit.

Another way of blocking out any induced component of alternating current in the windings 21—22 is illustrated in Fig. 6. Here the desired effect is brought about by introducing a counter alternating current voltage of such phase and magnitude that when combined with the alternating current voltage component induced in windings 21—22, the net A. C. voltage in these windings will always be zero. In Fig. 6, the source of the counter A. C. voltage is designated by terminals 28 and this volt-age is applied to the windings 21—22 through a compensation transformer 29, the primary winding 29a being connected to terminals 28 while the secondary winding 29b is connected in series with windings 21—22 and the direct current source 24. The core 29c of transformer 29 is also supplied with air gaps 29d to prevent core saturation.

In the operation of a magnetic induction accelerator constructed in accordance with this invention, the charged particles such as electrons are periodically introduced into the tube 16 from an electron emissive cathode each time that the inducing magnetic field $B_i$ reaches its maximum value in the negative direction ($-B_i$ max.) and are then accelerated continuously under the action of the inducing field until it reaches its maximum value in a positive direction ($+B_i$ max.) one half cycle later. At such time, the electrons will have attained an enormously high velocity and hence electron voltage and are then drawn off their accelerating orbit to produce desired useful effects such as for example to bombard a target anode and give off Roentgen rays.

In the interest of simplifying the drawing, the source of electrons, the target anode, and the timing means for synchronizing the injection of electrons into the tube 16 with the changing inducing field have not been illustrated in Fig. 2 since the constructions may vary and any one of several different arrangements already known may be used.

One way in which the electrons may be drawn off from the circular orbit upon reaching their final velocity is to rapidly expand the circular orbit so that the electrons spiral outwardly, and such expansion may be produced by changing the relationship between the control field $B_s$ and the inducing field $B_i$ as set forth in equation (3) so as to reduce the relative effect of the control field. In this manner the centripetal forces set up by the control field are over-ridden by the centrifugal forces acting upon the electrons and the latter hence fly outwardly along a spiral path. One way of changing the ratio between the inducing and control fields already known is to have the control field become saturated when it reaches a predetermined strength.

With the improved construction shown in this application, the necessary change in field strength ratio may also be obtained by a saturation of the core 27a of choke coil 27 in Fig. 5, or by saturation of the core 29c of the compensation transformer 29 in Fig. 6 at the correct instant. When the choke core 27a saturates, an alternating current component will begin to flow in windings 21—22 which produces an opposing magnetization of the control poles 14—14′ and thus diminishes the control field $B_s$ in comparison to the induction field $B_i$. The same effect is obtained when the core 29c of the compensation transformer 29 becomes saturated and hence the circular paths of the electrons widen out rapidly so that they can be led off to the outside or directed against a special anode to produce Roentgen rays.

If adjustment of the saturation of the choke 27 or compensation transformer 29 with respect to time be desired, this may be done conveniently by means of an auxiliary winding on the magnetic core of either device fed with direct current. Fig. 7 shows such an arrangement suitable for use when the choke 27 is used as the alternating current blocking device, the autxiliary winding 31 being wound on core 27a and connected to battery 32 through an adjustable resistor 33 and another auxiliary alternating current blocking member comprising choke 34 to prevent undesired reverse action on the direct current circuit with choke 27.

In Fig. 8, which shows a suitable way of adjusting the saturation of transformer 29 when the latter serves as the alternating current blocking member, the auxiliary winding is designated 35 and is connected to battery 36 through an adjustable resistor 37 and an auxiliary alternating current blocking member comprising choke 38 which serves the same function as choke 34 in Fig. 7.

If desired, the auxiliary alternating current blocking members in Figs. 7 and 8 (choke 34 in Fig. 7 and choke 38 in Fig. 8) could likewise be used for influencing the circular paths of the electrons by means of saturation. For this purpose, an auxiliary winding fed by direct current would have to be applied to the core of each of these chokes and the current through the winding varied for widening out the circular electron path. Such an arrangement would have an advantage over those shown in Figs. 7 and 8 since the control currents would be of a considerably lower order of magnitude.

Still another way of widening out the circular electron path after they have attained their final velocity would be to change the amount of iron in the magnetic circuit of the chokes 34 and 38. This could be done by making a part of the iron in the chokes movable and operating the movable part by a synchronous motor connected to the same source of alternating current as the main inducing winding coils 18—18'.

In all of the constructions so far considered, the inner and outer pre-magnetizing windings 21—22 have a like number of ampere-turns and are connected in such manner that one of them annuls the magnetizing effect of the other and no direct current component of magnetic flux is set up in the inducing poles 12—12'. However, it may be desirable in some cases to give one of the windings 21—22 a somewhat larger number of ampere-turns than the other and thus produce a direct current component of magnetic flux in the inducing poles. In order to explain this, reference should now be made to the curves in Fig. 9, which show the inducing flux $B_i$, the primary terminal voltage of the alternating current magnetization $U_1$, the secondary current $i_2$ (produced by the circling electron stream), and the corresponding effective component $i_1$ of the primary current. Since the stream of electrons passes out of the tube 16 in only half a cycle of the applied voltage (or even less), the corresponding secondary current $i_2$ will contain a direct current component designated in Fig. 9 by $i_{G2}$ and a corresponding component $i_{G1}$ in the primary current.

The magnetic flux produced by the direct current component $i_{G2}$ is not desirable and may be annulled by establishing a counter flux of like magnitude but of opposite direction. This desired objective may be attained by giving the outer pre-magnetizing winding 21 more ampere-turns than the inner winding 22. Thus these windings will establish the desired pre-magnetization of the control field $B_s$ and in addition will also furnish a direct current component of magnetic flux of such magnitude and direction as to practically annul the magnetic flux produced by the direct current component $i_{G2}$ of the electron stream. This constructional form of the invention is shown in Fig. 10 and the desired result is obtained by giving the outer pre-magnetizing winding 21' more turns than the inner winding 22'. This of course increases the ampere-turns of the outer winding even though it still carries the same magnitude of direct current as winding 22' due to the fact that, the two windings are connected in series opposition as in Fig. 3.

The undesirable pre-magnetizing effect by the flux produced by the direct current component $i_{G2}$ of the electron stream may also be eliminated in induction accelerators of the prior known type shown in Fig. 11 where the electrons are accelerated over only a quarter cycle of the inducing field $B_i$ i. e. between a zero value and a maximum in a positive direction ($+B_i$ max.) by using an auxiliary winding 41 around the outer side of the control field poles 42—42' and feeding this winding with direct current of appropriate direction and magnitude to annul the flux produced by $i_{G2}$.

Under the principles of this invention, it becomes quite practical to operate two magnetic induction accelerators of like construction in parallel. When this arrangement is used, the apparatus which was necessary for preventing the appearance of alternating current in the pre-magnetizing windings in the single accelerator i. e. choke 27 or compensation transformer 29 may now be omitted, the desired effect being attained by connecting the pre-magnetizing windings of the two induction accelerators in series in such manner that the induced alternating voltages in the two windings annul each other.

To make this possible, the alternating current windings of the two devices are connected in parallel, the direct current windings are series connected and the connections of the latter are arranged so that the induced currents are of opposite direction and therefore annul each other. The acceleration periods of the two induction devices are similarly displaced 180° apart and thus permits a continuous acceleration of electrons with the electron voltage reaching a maximum at the end of each half cycle.

Figs. 12 and 14 show in a somewhat diagrammatic manner two different possible arrangements for interconnecting two of the induction accelerators.

With reference to Fig. 12, induction accelerators of like construction are designated by rectangles I and II. Their respective alternating current windings 44—45 have the same relative direction and are fed in parallel from alternating current source terminals 46, it being noted that the currents flowing through windings 44—45 are also of like direction at any instant as indicated by the directional arrows. The direct current pre-magnetizing windings of the two transformers (each consisting of the series connected inner and outer coils on the control field poles) are for convenience shown as single windings 47—48 connected in series opposition to each other to a source of direct current designated by terminals 49.

With this arrangement, it can be easily established that upon a staggering of the transformation periods by the duration of a half cycle of the source of alternating current, the alternating currents produced in the direct current windings 47—48 oppose each other. This fact will be clear from a study of Fig. 13 in which $t$ designates time over which a complete cycle of flux in the two induction devices takes place for a complete cycle of the voltage U. The control field of one device must vary according to the curve $S_I$ and that of the other device according to the curve $S_{II}$, so that device I operates i. e. it accelerates electrons during the first half of the complete cycle shown while device II operates during the second half of the cycle. The alternating voltage that is induced in the pre-magnetizing winding 47 of device I follows the course indicated by the dotted sine curve $G_1$. In device II, an alternating voltage $G_2$ is likewise induced in the pre-magnetizing winding 48, and this voltage $G_2$ must have the same course as voltage $G_1$ since in the transformation period of device II, this alternating voltage must be drawn in to the curve U and the control field $S_{II}$, as was the case above for device I in the first half cycle of the voltage U. Curve $G_{II}$ thus coincides with curve $G_I$. If therefore as shown in Fig. 12, the pre-magnetizing windings 47—48 of the two induction devices are connected in opposition, the alternating voltages $G_I$ and $G_{II}$ the directions of which are indicated by the arrows through windings 47, 48 will annul each other, and at the same time, the iron in the two devices will be pre-magnetized in the correct sense by the direct current in windings 47—48.

Referring now to Fig. 14, which shows another practical arrangement for two interconnected induction devices I' and II' each operating over a half cycle of inducing current between $-B_{i\ max.}$ and $+B_{i\ max.}$, it will be seen that the alternating current windings 52 of device I' and 53 of device II' are connected in opposite sense to the A. C. source terminals 54 and the pre-magnetizing direct current windings 55—56 are connected in the same sense to the D. C. source terminals 57 so that again the alternating current voltages induced in the direct current windings 55, 56, the directions of which are indicated by the arrows through these windings, will annul each other.

For an explanation of the operation of the Fig. 14 construction, reference can be had to the curves plotted in Fig. 15. As in Fig. 13, the transformation periods of devices I' and II' are again displaced by a half cycle of the alternating voltage from each other. The alternating voltage for device I' is indicated by curve $U_1$ and that for device II' indicated by $U_2$, the latter being displaced in phase by 180° in relation to curve $U_1$ because of the reversed connection of winding 53 of device II'. The magnetic fluxes produced by voltages $U_1$ and $U_2$ are indicated by curves $\phi_I$ and $\phi_{II}$, respectively.

If the curves for the control fields $S_I$ and $S_{II}$ and the voltage $G_I$ and $G_{II}$ are drawn in according to the principles governing these factors in Fig. 13, it will be seen that $G_I$ and $G_{II}$ already have opposite phase and therefore annul each other, and at the same time, the direct current pre-magnetizations of windings 55 and 56 are produced in the correct sense.

Figs. 16 and 17 illustrate one way in which two induction devices may be combined into a single magnetic structure so that the magnetic flux produced by the alternating current and direct current windings of one device passes through the other.

In the dual arrangement, the magnetic structure of device $I_a$ which is symmetrical about axis $a$—$a$ includes cylindrical inducing pole pieces 61—61$a$ separated by air gap 62, and a pair of juxtaposed annular control pole pieces 63—63$a$. The annular tube 64 in which the charged particles are accelerated is positioned in the air gap 65 between control poles 63—63a at the central plane P—P. As with the construction shown in Fig. 2, the alternating current windings for induction accelerator Ia are split into two coil sections 66—67 above and below the plane P—P as are also the inner and outer pre-magnetizing direct current windings, the inner winding being designated by coil sections 68—69 while the outer winding is shown by coil sections 71—72. As with the Fig. 2 construction, current flows through the inner pre-magnetizing coils 68—69 in the opposite direction of that flowing through the outer pre-magnetizing coils 71—72.

The magnetic structure and windings of induction accelerator IIa, which are symmetrical about the axis b—b, are arranged in the same manner as the accelerator Ia and hence corresponding parts have been designated by like reference numerals but with primes added to the parts of accelerator IIa to distinguish them on the drawing.

The magnetic field structures of the two transformers are connected by top and bottom laminated yokes 73 so that the magnetic fluxes produced by the windings of one of the induction accelerators also pass through the other accelerator.

The direction of electron acceleration in each device is indicated by the arrows in Fig. 17 and it will be seen from this figure that the electron tubes 64—64' include a pair of tangentially arranged arms. Arms 64a and 64a' serve as the electron inlets in which the electron emissive cathode may be placed while arms 64b and 64b' serve as outlets for taking the electrons out of the tubes when they have reached their final velocity. If the electrons in each tube are used to bombard a target anode, the latter could be placed in these outlet arms.

The connections to the alternating current windings and the direct current pre-magnetizing windings for the dual magnetic induction structure may be made in accordance with the wiring diagrams of either Fig. 12 or Fig. 14 so that electron acceleration takes place in the two devices Ia and IIa in alternate half cycles of the applied alternating current.

If desired, the air gaps 62 and 62' between the inducing poles of the two devices may be omitted in which case the then uninterrupted inducing core of each device would be surrounded with an auxiliary opposing winding as described in my co-pending application, Ser. No. 715,933, filed December 13, 1946, now abandoned.

In conclusion, it is to be understood that while the foregoing described embodiments of the invention are to be preferred, various changes in the construction and arrangements of parts may be made without departing from the spirit and scope of the invention as defined in the appended claims.

I claim:

1. A magnetic induction device comprising an annular tube within which a stream of charged particles following an orbit may be accelerated to high velocity, a magnetic field structure associated with said tube and which includes a central inducing core surrounded by said tube and a pair of annular control field poles in juxtaposed relation at the particle orbit, a main winding surrounding said inducing core and said control poles adapted to be energized with alternating current to establish magnetic fields varying cyclically with time and perpendicular to the plane of said orbit in said inducing core and control field poles, and means pre-magnetizing substantially only the control field poles of said magnetic field structure to produce therein a field constant with time and perpendicular to the plane of the orbit thereby to enable said stream of particles to be injected into said orbit when said time-varied magnetic field is at maximum value of one polarity in said inducing core and to be accelerated until said time-varied magnetic field in said inducing core reaches its maximum value at its opposite polarity a half cycle later.

2. A magnetic induction device as defined in claim 1 for accelerating charged particles for a half cycle of the cyclically varying magnetic field wherein the means for pre-magnetizing said control field poles is comprised of winding means associated with said control field poles and energized by direct current.

3. A magnetic induction device comprising an annular tube within which a stream of charged particles following a closed orbit may be accelerated to high velocity, a magnetic field structure associated with said tube and which includes a central inducing core surrounded by said tube and a pair of annular control field poles in juxtaposed relation at the particle orbit, a main winding surrounding said inducing core and said control poles adapted to be energized with alternating current to establish magnetic fields varying with time and perpendicular to the plane of said orbit in said inducing core and control field poles, a pair of windings disposed at the inner and outer sides respectively of said control poles, circuit means to energize said windings with direct current to set up a pre-magnetizing flux in said magnetic field structure limited substantially to said control field poles and perpendicular to the plane of said orbit and of such strength that said particles when introduced into said tube at a maximum value of said inducing field of one polarity may be accelerated until said inducing field reaches its maximum value of opposite polarity.

4. A magnetic induction device as defined in claim 3 characterized by the fact that the direct current circuit for said pre-magnetizing windings includes means for blocking out alternating current induced in such windings by the alternating current flowing in said main winding.

5. A magnetic induction device as defined in claim 3 characterized by the fact that the direct current circuit for said pre-magnetizing windings includes a choke for blocking out alternating current induced in such windings by the alternating current flowing in said main winding.

6. A magnetic induction device as defined in claim 3 characterized by the fact that a transformer is utilized for blocking out alternating current induced in said pre-magnetizing windings by the alternating current flowing in said main winding, one side of said transformer being connected in the circuit of said pre-magnetizing windings and the other connected to a source of alternating current voltage.

7. A magnetic induction device as defined in claim 3 characterized by the fact that the direct current circuit for said pre-magnetizing windings includes a choke for blocking out alternating current induced in such windings by the alternating current flowing in said main winding, said choke becoming saturated at a predetermined point in the acceleration phase of said particles to thereby lessen the effect of said control field and expand the circular orbit of said particles.

8. A magnetic induction device as defined in claim 3 characterized by the fact that the direct current circuit for said pre-magnetizing windings includes a transformer connected therein fed by an alternating current voltage of such magnitude and phase as to oppose the alternating current voltage induced in said pre-magnetizing windings by the alternating current flowing in said main winding, said transformer becoming saturated at a predetermined point in the acceleration phase of said particles to thereby lessen the effect of said control field and expand the circular orbit of said particles.

9. A magnetic induction device as defined in claim 3 characterized by the fact that the direct current circuit for said pre-magnetizing windings includes a saturable choke for blocking out alternating current induced in such windings by the alternating current in said main winding, and means for adjusting the saturation characteristic of said choke.

10. A magnetic induction device as defined in claim 3 characterized by the fact that the direct current circuit for said pre-magnetizing windings includes a transformer having a saturable core, said transformer being fed by an alternating current of such magnitude and phase as will oppose the alternating current induced in said pre-magnetizing windings by the alternating current in said main winding, and means for adjusting the saturation characteristic of said transformer.

11. A magnetic induction device as defined in claim 3 characterized by the fact that the direct current winding at the outer side of said control poles has a larger number of ampere turns than the winding at the inner side of the control poles, the extra ampere turns of the outer winding producing a flux opposing the flux set up by the direct current component of the stream of charged particles.

12. A magnetic induction device as defined in claim 3 wherein the direct current fed winding at the outer side of said control poles has more ampere turns than the direct current fed winding at the inner side of said control poles.

13. Apparatus for accelerating charged particles comprising a pair of magnetic induction devices; each said device including an annular tube within which a stream of charged particles following a closed orbit may be accelerated to high velocity, a magnetic field structure associated with said tube and which includes a central inducing core surrounded by said tube and a pair of control poles in juxtaposed relation at the particle orbit, a main alternating current winding surrounding said inducing core and control poles to establish time-varying magnetic fields in said inducing core and control poles, and direct current winding means at the inner and outer sides of said control poles to establish a pre-magnetizing magnetic field in said control poles; a source of alternating current; a source of direct current; means connecting the main winding of each induction device in parallel to said source of alternating current; and means connecting the direct current winding means of said devices in series to said source of direct current; said induction devices being operated over half cycles of said alternating current source displaced 180° apart and the alternating currents induced respectively in the direct current winding means of each induction device by the main alternating current winding thereof counteracting each other.

14. Apparatus for accelerating particles as defined in claim 13 wherein the main alternating current windings of said induction devices are connected in like polarity to said source of alternating current and the direct current winding means of said induction devices are connected in reverse polarity to said source of direct current.

15. Apparatus for accelerating particles as defined in claim 13 wherein the main alternating current windings of said induction devices are connected in reversed polarity to said source of alternating current and the direct current winding means of said induction devices are connected in like polarity to said source of direct current.

16. Apparatus for accelerating charged particles as defined in claim 13 characterized by the fact that the magnetic field structures of both induction devices are interconnected so that the magnetic fluxes produced respectively by the alternating current and direct current windings of each induction device pass through the other induction device.

References Cited in the file of this patent

UNITED STATES PATENTS

| Number | Name | Date |
| --- | --- | --- |
| 2,394,072 | Westendorp | Feb. 5, 1946 |

OTHER REFERENCES

Journal of Applied Physics, vol. 16, November 1945; pages 657–660, "The Use of Direct Current in Induction Electron Accelerator," by W. F. Westendorp.